United States Patent [19]
Gellert

[11] Patent Number: 5,437,093
[45] Date of Patent: Aug. 1, 1995

[54] METHOD OF MAKING AN INJECTION MODLING NOZZLE

[76] Inventor: Jobst U. Gellert, 7A Prince Street, Georgetown, Ontario, Canada, L7G 2X1

[21] Appl. No.: 321,007
[22] Filed: Oct. 11, 1994
[51] Int. Cl.⁶ .............................................. H05B 3/00
[52] U.S. Cl. ..................................... 29/611; 164/108; 228/180.1
[58] Field of Search .................... 29/611; 164/80, 108, 164/110; 228/180.1, 186, 187

[56] References Cited
U.S. PATENT DOCUMENTS 4,355,460 10/1982 Gellert .................................. 29/611
4,403,405  9/1983 Gellert .................................. 29/611
4,771,164  9/1988 Gellert ................................ 219/421

Primary Examiner—P. W. Echols
Attorney, Agent, or Firm—Dalesman & Company

[57] ABSTRACT

A method of manufacturing an injection molding nozzle having an integral electrical heating element. The heating element is mounted in a space formed between an inner core, an outer rear collar and an outer sleeve. The space is first sealed by brazing with a nickel alloy brazing material and a copper conductive material is then cast into the space. Both the brazing and casting are done in a single controlled cycle of a vacuum furnace. An insulative cap is placed over the assembly so a supply of inert gas to the vacuum furnace cools the copper conductive material from the bottom up. This produces unidirectional solidification to avoid the formation of voids in the copper conductive material and improve thermal conductivity.

10 Claims, 5 Drawing Sheets

METHOD OF MAKING AN INJECTION MODLING NOZZLE

BACKGROUND OF THE INVENTION

This invention relates generally to injection molding and more particularly to a method of manufacturing an injection molding nozzle having an integral heating element in which both brazing and casting are carried out in a single heating cycle of a vacuum furnace.

Making an injection molding nozzle with an integral electrical heating element has many advantages such as improved heat transfer, reduced corrosion and longer operating life. It is well known to make such integral nozzles by first sealing the components together to form a space around a helical portion of an electrical heating element, usually by brazing in a vacuum furnace. The nozzle is then reinserted into the vacuum furnace to cast a conductive material such as copper into the sealed space around the helical portion of the heating element. In the previous methods, a conductive material such as a beryllium copper alloy was selected to have a lower melting temperature than the brazing material. Different variations of this method are described in the applicant's U.S. Pat. Nos. 4,355,460 which issued Oct. 26, 1982, 4,403,405 which issued Sep. 13, 1983, and 4,771,164 which issued Sep. 13, 1988. While these previous methods have many advantages, they all have the disadvantage that the sealing of the space around the helical portion of the heating element and the casting of the copper into this space are two separate steps requiring two different cycles of the vacuum furnace. Furthermore, in the past, integrally casting the heating element in the conductive material has improved the extremely critical factor of thermal conductivity by reducing air pockets in the nozzle around the heating element. It has now been found that thermal conductivity can be further improved by cooling the nozzle in a manner to provide unidirectional solidification of the conductive material from the bottom up to prevent the formation of voids due to shrinkage.

SUMMARY OF THE INVENTION

Accordingly, it is an object of the present invention to at least partially overcome the disadvantages of the prior art by providing a method of manufacturing an injection molding nozzle in which both brazing to seal the space around the heating element and casting the conductive material into the sealed space are carried out in a single controlled cycle of a vacuum furnace.

It is a further object of the invention to provide a method of cooling the nozzle to produce unidirectional solidification of the conductive material in the space from the bottom.

To this end, in one of its aspects, the invention provides a method of manufacturing an integral heated injection molding nozzle having a rear end, a front end, an elongated inner core portion with a melt passage extending therethrough from the rear end, an outer collar portion encircling the inner core portion adjacent the rear end, an outer sleeve portion extending from the outer collar portion towards the front end, an electrical heating element with a helical portion wound around the inner core portion and a lead portion extending outwardly through the outer collar portion, a conductive portion extending around the helical portion of the heating element between the inner core portion and the outer sleeve portion, including the steps of forming an assembly by mounting an outer collar and the heating element onto an inner core, mounting an elongated outer sleeve in a position to form a space around the helical portion of the heating element between the outer sleeve and the inner core, applying brazing material to the joints between the inner core, the outer collar and the outer sleeve and brazing the assembly together in a substantially oxygen free atmosphere in a vacuum furnace to seal said space against leakage when the assembly is in an upright position with the front end directly above the rear end, casting a molten conductive material into said space with the assembly in the upright position in a substantially oxygen free atmosphere in a vacuum furnace to form the conductive portion integrally bonded with the inner core portion, outer collar portion, heating element and outer sleeve portion, and machining the cast nozzle to provide a desired shape and finish, having the improvement wherein the conductive material has a melting temperature higher than the melting temperature of the brazing material, the assembly is brazed together and the conductive material is cast into said space in a single controlled cycle of the vacuum furnace which includes first raising the temperature in the vacuum furnace to a first predetermined temperature above the melting temperature of the brazing material and below the melting temperature of the conductive material, lowering the temperature in the vacuum furnace to a second predetermined temperature below the solidification temperature of the brazing material, holding the second temperature for a sufficient period of time to braze the assembly together, and then raising the temperature in the vacuum furnace to a third predetermined temperature sufficiently above the melting temperature of the conductive material to cast the conductive material into said space around the helical portion of the heating element between the outer sleeve and the inner core without melting the brazing material.

Further objects and advantages of the invention will appear from the following description taken together with the accompanying drawings.

DETAILED DESCRIPTION OF THE INVENTION

Figure 1:
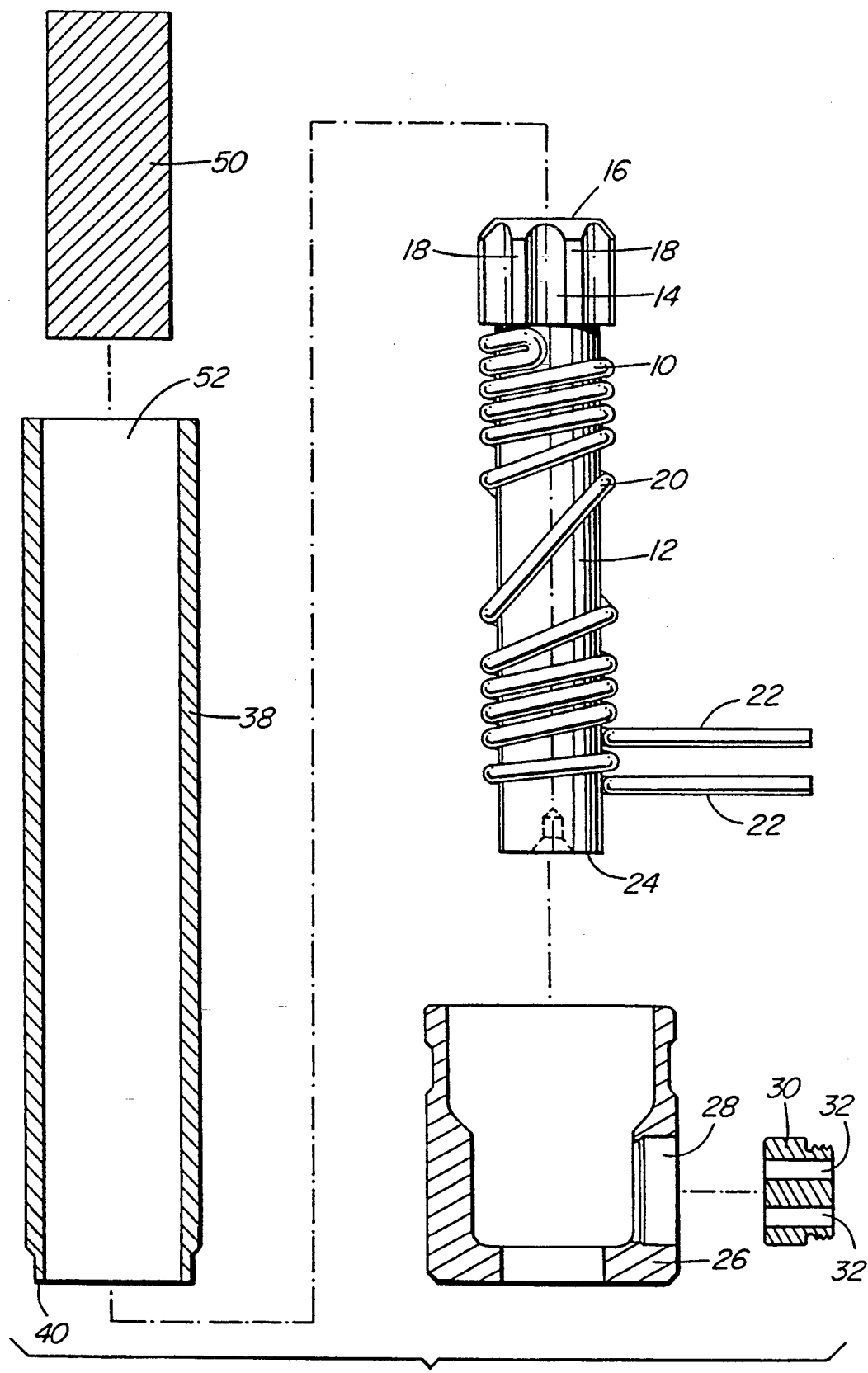
FIG. 1 is an exploded sectional view showing how the components of an injection molding nozzle are assembled according to a preferred embodiment of the invention.
Figure 2:
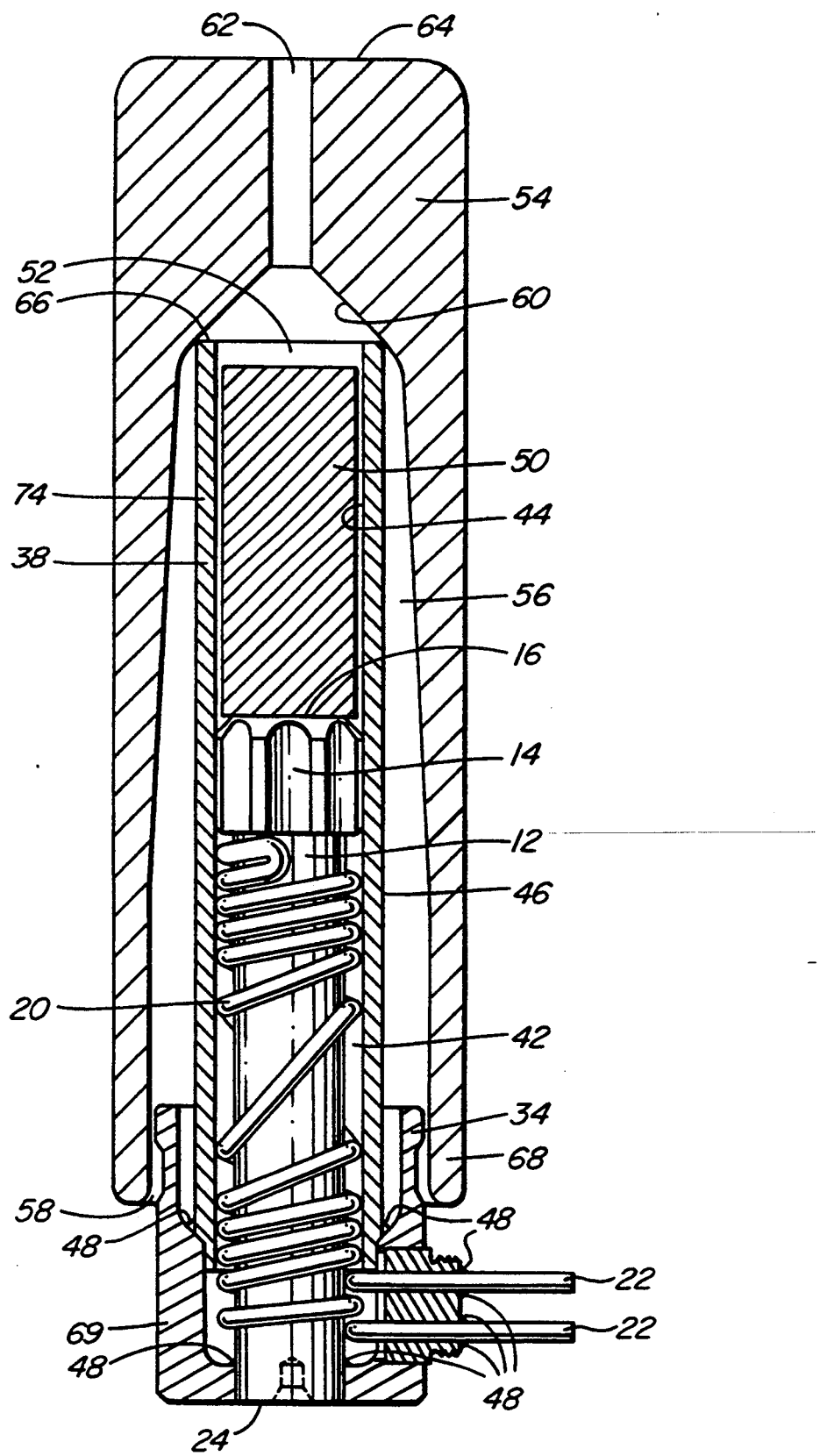
FIG. 2 is a sectional view of an assembly of these components with an insulative cap according to a first embodiment of the invention in place for insertion into a vacuum furnace.

Reference is first made to FIGS. 1 and 2 to describe how the components of an injection molding nozzle with an integral electrical heating element are assembled according to the invention. An electrical heating element 10 is wound around an elongated inner core 12 formed of a suitable material such as hot work tool steel. In this embodiment, the inner core 12 has an enlarged head 14 at the upper end 16 (as shown) around which a number of spaced grooves 18 extend longitudinally to provide for the flow of molten conductive material therethrough, as described below. The electrical heating element 10 is wound with a helical portion 20 extending around the inner core 12 and two lead portions 22 extending outwardly near the lower end 24 of the inner core 12. The heating element 10 is wound with a predetermined configuration having fewer coils around the middle of the inner core 12 where there is less heat loss. In this embodiment, the heating element 10 has a fine coiled resistance wire extending through an electrically insulating material such as magnesium oxide powder in an outer steel casing. In other embodiments, other suitable types and configurations of heating elements can be used depending upon the thermal requirements of the application.

Next, a hollow outer collar 26 is mounted on the lower end 24 of the inner core 12 with the two lead portions 22 of the heating element 10 extending out through a radial opening 28 through the outer collar 26. A plug 30 having a pair of holes 32 to receive the lead portions 22 of the heating element 10 therethrough is then fitted into the radial opening 28. In this embodiment, the outer collar 26 has an insulative flange portion 34 which supports the completed nozzle 36 without excessive heat loss when it is mounted in a cold mold (not shown).

An elongated outer sleeve 38 made of a suitable protective material such as stainless steel is then mounted with its lower end 40 seated in the outer collar 26 to form a space 42 around the helical portion 20 of the heating element 10 between the inner core 12 and the surrounding outer sleeve 38. As best seen in FIG. 2, in this embodiment, the outer sleeve 38 extends upwardly past the upper end 16 of the inner core 12 to form a cylindrical hopper 44 above the head 14 of the inner core 12. During mounting, the inner core 12, outer collar 26, plug 30 and outer sleeve 38 are tack welded in place with a laser to form an assembly 46.

A suitable brazing material such as a nickel alloy is then applied along the joints between the inner core 12, the heating element 10, plug 30 and outer sleeve 38 where indicated by reference numeral 48 in FIG. 2. This is in the form of a bead along the outer joints and a powder along the inner joints. A slug of a suitable conductive material 50 is then loaded into the hopper 44 through its upper open mouth 52. In this embodiment, the conductive material 50 is substantially pure copper which has a melting temperature of about 1980° F. which is substantially higher than the melting temperature of the nickel alloy brazing material 48 which is about 1850° F. Other combinations of suitable materials can be used as long as the conductive material 50 has a melting temperature above the melting temperature of the brazing material 48, and the brazed seal is not remelted by the casting temperature. After the slug of conductive material 50 is loaded into the hopper 44, an elongated insulative cap 54 is mounted on the assembly 46. As clearly seen in FIG. 2, in this embodiment, the insulative cap 54 has a tapered central opening 56 with a downwardly open mouth 58 through which the assembly 46 is received. The central opening 56 has a shoulder 60 which tapers inwardly to a small vent bore 62 which extends upwardly to the upper end 64 of the insulative cap 54. The insulative cap 54 is removably supported in this position by the tapered shoulder 60 resting on the upper end 66 of the outer sleeve 38. As can be seen, in this embodiment, the outer skirt 68 of the protective cap 54 extends downwardly around the flange portion 34 of the outer collar 26, leaving a lower portion 69 of the assembly 46 not covered by the insulative cap 54. In other embodiments, a greater or lesser portion or the entire assembly can be covered by the insulative cap 54 as required to produce unidirectional solidification of the conductive material 50, as discussed below. The reusable insulative cap 54 is preferably made of a suitable ceramic material, although it can also be made of other suitable materials such as stainless steel.

Figure 3:
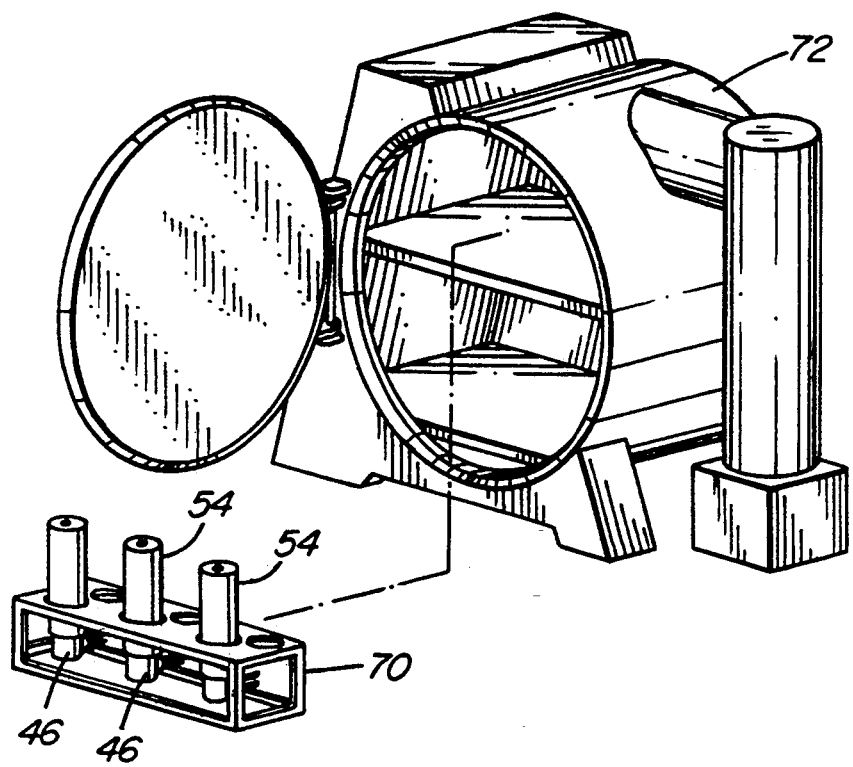
FIG. 3 shows a batch of these assemblies in position for insertion into the vacuum furnace.
Figure 4:
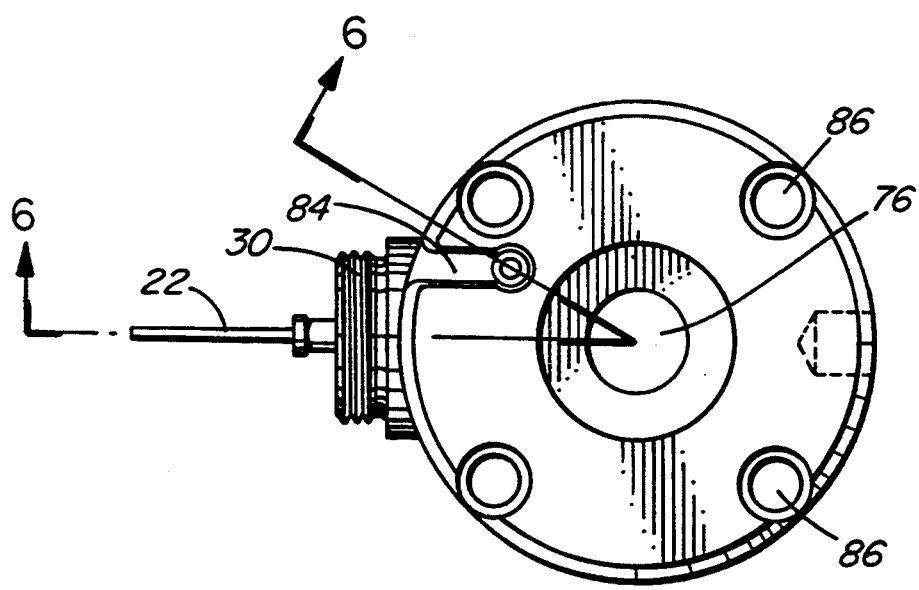
FIG. 4 is a view from the rear end of a completed injection molding nozzle made according to the preferred embodiment of the invention.

The assemblies 46, each sitting in a rack 70 in the upright position shown in FIG. 3 and covered by an insulative cap 54, are then inserted in batches into a vacuum furnace 72. While each assembly 46 is shown having a separate cap 54, a common cap having different openings therein can be mounted on a number of assemblies in a batch. During a single controlled cycle of the vacuum furnace 72, as described below, each assembly 46 is first brazed together to seal the space 42 around the heating element 10 and then the conductive material 50 is cast into the space 42 to form an integral injection molding heated nozzle 36. As the furnace 72 is gradually heated it is evacuated to a relatively high vacuum to remove substantially all of the oxygen. The vent bores 62 in the insulative caps 54 ensure no oxygen is trapped inside the caps 54. The vacuum is then reduced by partially backfilling the furnace 72 with an inert gas such as argon or nitrogen to avoid sputtering. The furnace 72 is heated to a first temperature of approximately 1950° F. which is above the melting point of the nickel alloy brazing material 48 and below the melting point of the copper conductive material 50. This melts the nickel alloy brazing material 48 which runs along the joints where it was applied between the heating element 10, inner core 12, plug 30, and outer sleeve 38. The temperature in the vacuum furnace is then lowered to a second temperature of approximately 1800° F. which is below the solidification temperature of the nickel alloy brazing material 48. This temperature is held for a sufficient period of time of approximately 30 minutes to braze the assembly 46 together to seal the space 42 around the helical portion 20 of the heating element 10 against leakage. This produces a type of diffusion braze with the steel along the joints which has a melting temperature even higher than the melting temperature of the copper conductive material 50.

The temperature in the vacuum furnace 72 is then raised to a third temperature of approximately 2035° F. which is sufficiently above the melting temperature of the copper conductive material 50 to melt it, but not high enough to melt the diffusion brazes along the joints sealing the space 42. When the copper conductive material 50 melts, it flows downwardly from the hopper 44 through the spaced grooves 18 in the head 14 of the inner core 12 to fill the space 42 around the helical portion 20 of the heating element 10 between the inner core 12 and outer sleeve 38. As mentioned above, it is possible to cast the molten copper conductive material 50 into the space 42 without it leaking out through the brazed joints because the melting temperature of the brazes or the brazing material 48 along the joints is considerably higher after brazing than it was before. The controlled cycle of the vacuum furnace 72 is then completed by gradually cooling it down with a supply of inert gas such as nitrogen prior to removal of the integral cast nozzles 36. The insulative effect of the surrounding insulative cap 44 ensures that the copper conductive material 50 cools from the bottom up, thus producing unidirectional solidification from the bottom to the top. This avoids the formation of any voids due to shrinkage of the copper conductive material 50 during cooling and thus provides more efficient and uniform thermal conductivity from the heating element 10 to the melt flowing through the nozzle 36. Casting the copper conductive material 50 in a partial vacuum produces a metallurgical bonding of the copper conductive material 50 to the steel casing of the heating element 10 and the steel inner core 12, outer collar 26, and outer sleeve 38. Combined with the unidirectional solidification of the copper conductive material 50, this produces an integral injection molding heated nozzle 36 having very improved thermal characteristics.

Figure 5:
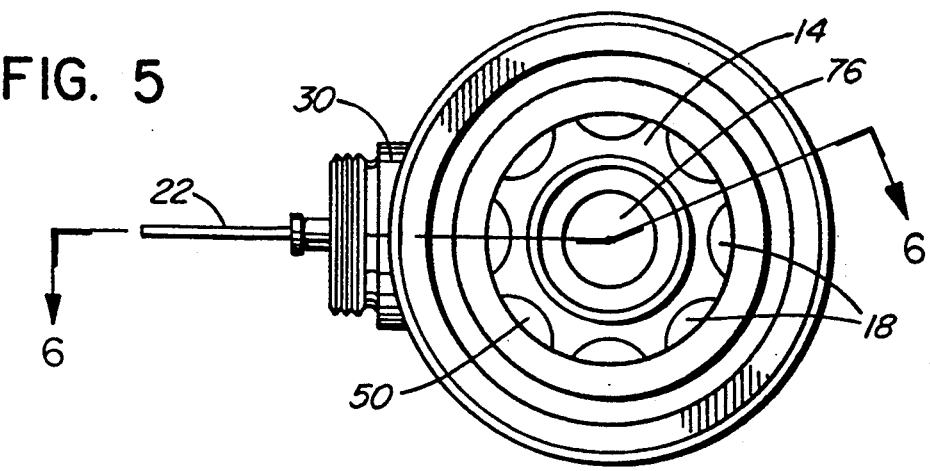
FIG. 5 is a view from the front end of the completed injection molding nozzle made according to the preferred embodiment of the invention.
Figure 6:
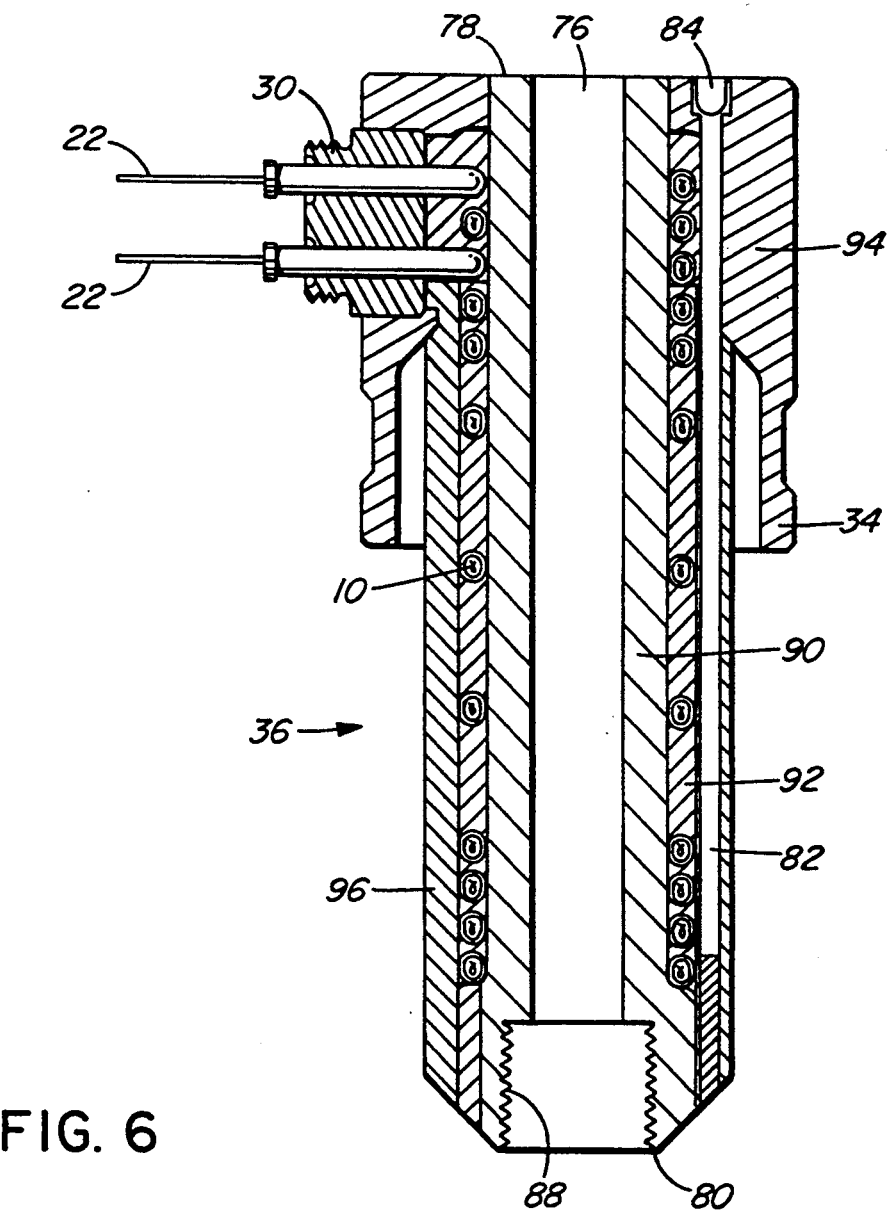
FIG. 6 is a sectional view along line 6—6 in FIGS. 4 and 5.

After removal from the vacuum furnace 72, each nozzle 36 is machined to remove the upper portion 74 of the outer sleeve 38 which forms the hopper 44, and provide the completed nozzle 36 with a clean finish. As seen in FIG. 6, the nozzle is also drilled to provide a central melt bore 76 extending therethrough from the rear end 78 to the front end 80 and to form a thermocouple element bore 82 extending forwardly from a groove 84 in the rear end 78. Threaded holes 86 are also provided in the rear end 78 to receive mounting screws. While the front end 80 of the nozzle 36 has been machined in this embodiment to form a cylindrical seat 88 to receive a gate insert (not shown), in other embodiments it can be machined to provide for various other gating configurations. As seen in FIG. 5, the completed nozzle 36 has an inner core portion 90 through which the central melt bore 76 extends. The conductive portion 92 formed by the copper conductive material 50 is integrally bonded around the inner core portion 90 as well as to the heating element 10, the outer collar portion 94 with the plug 30 and the outer sleeve portion 96. The copper conductive material 50 also integrally fills the grooves 18 around the head 14 of the inner core 12 which improves the thermal conductivity near the front end 80 of the nozzle.

In use, the heated nozzle 36 is mounted in a cooled mold and melt flows through the central melt bore 76 to a gate leading to a cavity. While the use is the same as existing injection molding heated nozzles, the thermal performance of nozzles manufactured according to the present invention is considerably improved.

Figure 7:
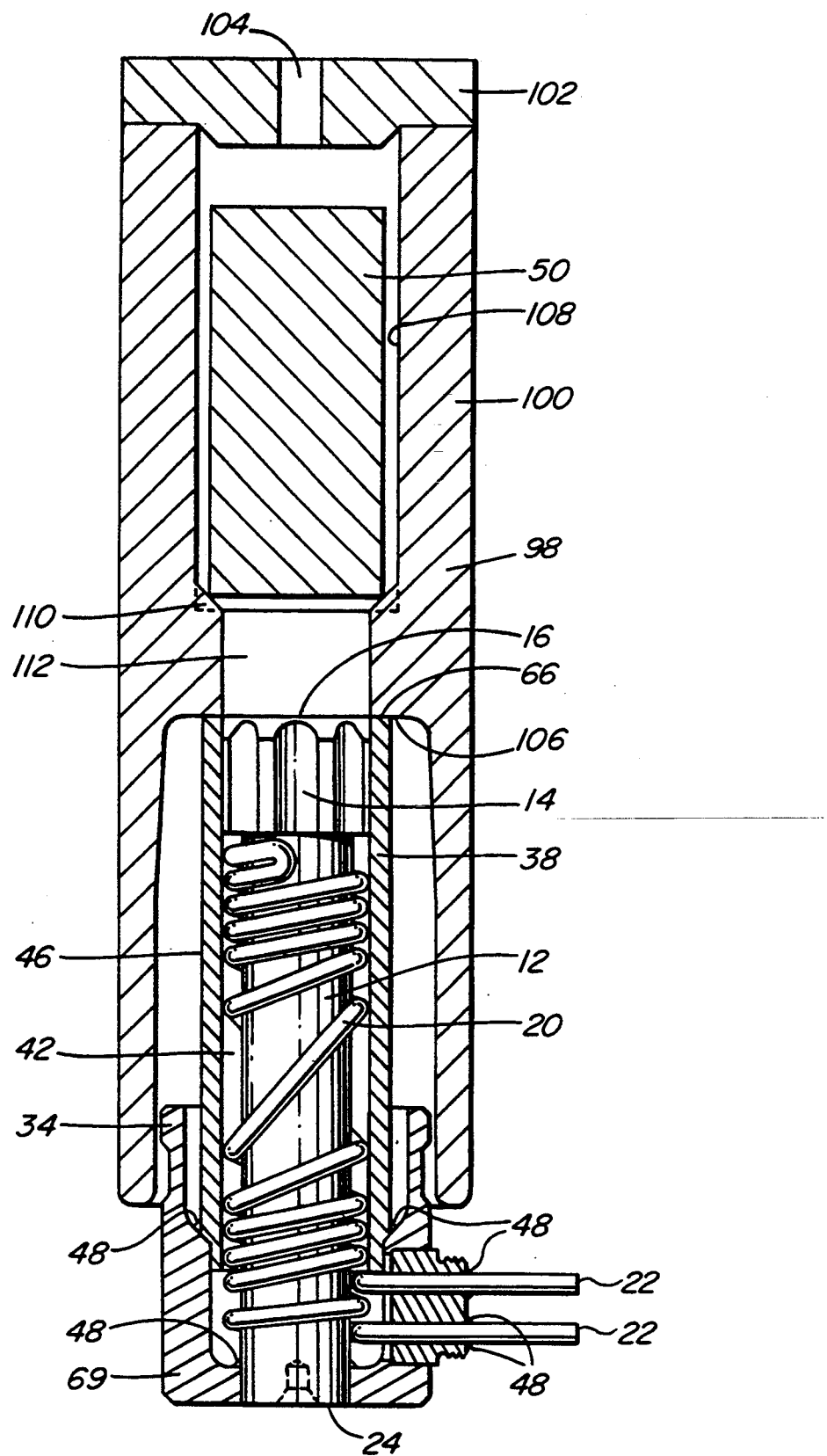
FIG. 7 is a sectional view of an assembly of these components with an insulative cap according to a second embodiment of the invention in place for insertion into a vacuum furnace.

Reference is now made to FIG. 7 which shows the insulative cap 98 having a different structure which is used in this embodiment of the invention. As most of the elements are the same as those described above, elements common to both embodiments are described and illustrated using the same reference numerals. In this embodiment, the insulative cap 98 has an elongated hollow outer portion 100 with a lid 102 through which a vent bore 104 extends. The outer portion 100 has an inwardly extending shoulder 106 which sits on the upper end 66 of the outer sleeve 38. As can be seen, in this case the insulative cap 98 rather than the outer sleeve 38 forms a hopper 108 into which the slug of copper 50 is inserted prior to insertion into the vacuum furnace 72. The slug of copper 50 rests on inwardly tapered ribs 110 to ensure proper venting of the space 112 beneath the slug of copper 50. Otherwise, the method of manufacture is the same as that described above except that there is no upper portion of the outer sleeve 38 which has to be removed after casting. The insulative cap 98 is merely removed and the nozzle 36 machined to provide the necessary finish. The insulative cap 98 is preferably made of ceramic and can be sprayed so the molten copper will not stick to it to facilitate reuse.

While the description of the method of manufacturing a heated injection molding nozzle 36 according to the invention has been given with respect to preferred embodiments, it will be evident that various other modifications are possible without departing from the scope of the invention as understood by those skilled in the art and as defined in the following claims.

The embodiments of the invention in which an exclusive property or privilege is claimed are defined as follows:

1. In a method of manufacturing an integral heated injection molding nozzle having a rear end, a front end, an elongated inner core portion with a melt passage extending therethrough from the rear end, an outer collar portion encircling the inner core portion adjacent the rear end, an outer sleeve portion extending from the outer collar portion towards the front end, an electrical heating element with a helical portion wound around the inner core portion and a lead portion extending outwardly through the outer collar portion, a conductive portion extending around the helical portion of the heating element between the inner core portion and the outer sleeve portion, including the steps of forming an assembly by mounting an outer collar and the heating element onto an inner core, mounting an elongated outer sleeve in a position to form a space around the helical portion of the heating element between the outer sleeve and the inner core, applying brazing material to the joints between the inner core, the outer collar and the outer sleeve and brazing the assembly together in a substantially oxygen free atmosphere in a vacuum furnace to seal said space against leakage when the assembly is in an upright position with the front end directly above the rear end, casting a molten conductive material into said space with the assembly in the upright position in a substantially oxygen free atmosphere in a vacuum furnace to form the conductive portion integrally bonded with the inner core portion, outer collar portion, heating element and outer sleeve portion, and machining the cast nozzle to provide a desired shape and finish, the improvement wherein;

the conductive material has a melting temperature higher than the melting temperature of the brazing material, the assembly is brazed together and the conductive material is cast into said space in a single controlled cycle of the vacuum furnace which includes first raising the temperature in the vacuum furnace to a first predetermined temperature above the melting temperature of the brazing material and below the melting temperature of the conductive material, lowering the temperature in the vacuum furnace to a second predetermined temperature below the solidification temperature of the brazing material, holding the second temperature for a sufficient period of time to braze the assembly together, and then raising the temperature in the vacuum furnace to a third predetermined temperature sufficiently above the melting temperature of the conductive material to cast the conductive material into said space around the helical portion of the heating element between the outer sleeve and the inner core without melting the brazing material.

2. A method of manufacturing an injection molding nozzle as claimed in claim 1 wherein the controlled cycle of the vacuum furnace further includes the step of gradually cooling the vacuum furnace with a supply of inert gas prior to removal of the cast nozzle.

3. A method of manufacturing an injection molding nozzle as claimed in claim 2 further including placing an insulative cap having an elongated opening with a downwardly open mouth over the assembly during the heating cycle in the vacuum furnace with the assembly extending upwardly into the opening, whereby the conductive material cools progressively upwardly.

4. A method of manufacturing an injection molding nozzle as claimed in claim 3 wherein a predetermined portion of the assembly extends upwardly into the opening in the insulative cap.

5. A method of manufacturing an injection molding nozzle as claimed in claim 4 wherein the outer sleeve extends upwardly past the front end in the upright position to an upper end to form a hopper, and loading a predetermined quantity of the conductive material into the hopper prior to insertion of the assembly into the vacuum furnace, whereby during casting in the vacuum furnace the conductive material melts and runs down into said space around the helical portion of the heating element between the outer sleeve and the inner core.

6. A method of manufacturing an injection molding nozzle as claimed in claim 5 wherein the insulative cap is removably supported with a portion of the assembly received in the opening by contact against the upper end of the outer sleeve.

7. A method of manufacturing an injection molding nozzle as claimed in claim 6 wherein the insulative cap has a vent bore extending upwardly from the opening in which the assembly is received.

8. A method of manufacturing an injection molding nozzle as claimed in claim 7 including attaching the inner core, the outer core and the outer sleeve together by tack welding prior to brazing.

9. A method of manufacturing an injection molding nozzle as claimed in claim 8 wherein the conductive material is copper.

10. A method of manufacturing an injection molding nozzle as claimed in claim 9 wherein the brazing material is a nickel alloy.

* * * * *